US011552309B2

(12) United States Patent
Kraft et al.

(10) Patent No.: US 11,552,309 B2
(45) Date of Patent: Jan. 10, 2023

(54) ELECTROCHEMICAL DEVICE

(71) Applicant: ElringKlinger AG, Dettingen (DE)

(72) Inventors: Juergen Kraft, Metzingen (DE); Peter Stahl, Oppenweiler (DE); Michael Goetz, Dettingen (DE); Manuel Morcos, Tuebingen (DE)

(73) Assignee: ElringKlinger AG, Dettingen (DE)

( * ) Notice: Subject to any disclaimer, the term of this patent is extended or adjusted under 35 U.S.C. 154(b) by 558 days.

(21) Appl. No.: 15/272,963

(22) Filed: Sep. 22, 2016

(65) Prior Publication Data

US 2017/0012301 A1    Jan. 12, 2017

Related U.S. Application Data

(63) Continuation of application No. PCT/EP2015/056062, filed on Mar. 23, 2015.

(30) Foreign Application Priority Data

Mar. 24, 2014  (DE) ..................... 10 2014 104 017.1

(51) Int. Cl.
  *H01M 8/00*   (2016.01)
  *H01M 8/0271*  (2016.01)
  (Continued)

(52) U.S. Cl.
  CPC ....... *H01M 8/0271* (2013.01); *H01M 8/0258* (2013.01); *H01M 8/0267* (2013.01);
  (Continued)

(58) Field of Classification Search
  CPC ............. H01M 8/0276; H01M 8/0258; H01M 8/0284; H01M 8/0267; H01M 8/241; H01M 8/242; H01M 8/2457; Y02E 60/50
  See application file for complete search history.

(56) References Cited

U.S. PATENT DOCUMENTS 3,432,357 A * 3/1969 Dankese ............... B01D 47/00
                                                          429/434
2003/0017377 A1   1/2003 Diez
(Continued)

FOREIGN PATENT DOCUMENTS

DE   10 2013 021 469         8/2014
JP      2006-128040    *  5/2006  .............. H01M 8/02
(Continued)

OTHER PUBLICATIONS

JPO Abstract (JP 2006-128040) May 18, 2006.*
(Continued)

*Primary Examiner* — Cynthia H Kelly
*Assistant Examiner* — Monique M Wills
(74) *Attorney, Agent, or Firm* — Womble Bond Dickinson (US) LLP

(57) ABSTRACT

An electrochemical device comprises a stack consisting of a plurality of electrochemical units which succeed one another along a stack direction and which each include a membrane electrode arrangement, a bipolar plate and at least one sealing element, at least one medium channel which extends along the stack direction, a flow field through which a medium can flow from the medium channel to another medium channel, and a connection channel through which the flow field and the medium channel are in fluid connection with one another, wherein the sealing arrangement includes a connection channel region in which the sealing arrangement crosses the connection channel, and at least one neighboring region which is located in front of or behind the connection channel region in the longitudinal direction of the sealing arrangement, wherein the sealing arrangement has a lower average height in the connection channel region than in the neighboring region.

13 Claims, 6 Drawing Sheets

(51) Int. Cl.
*H01M 8/2457* (2016.01)
*H01M 8/241* (2016.01)
*H01M 8/0267* (2016.01)
*H01M 8/0258* (2016.01)
*H01M 8/0284* (2016.01)
*H01M 8/2483* (2016.01)
*H01M 8/10* (2016.01)

(52) U.S. Cl.
CPC ......... *H01M 8/0284* (2013.01); *H01M 8/241* (2013.01); *H01M 8/2457* (2016.02); *H01M 8/2483* (2016.02); *H01M 2008/1095* (2013.01)

(56) References Cited

U.S. PATENT DOCUMENTS

| | | | | |
|---|---|---|---|---|
| 2003/0104262 | A1* | 6/2003 | Kuroki | H01M 8/0213 429/510 |
| 2004/0209150 | A1* | 10/2004 | Rock | H01M 8/0273 429/434 |
| 2007/0031719 | A1* | 2/2007 | Ishioka | H01M 8/0247 429/483 |
| 2007/0231659 | A1* | 10/2007 | Ma | H01M 8/0282 429/444 |
| 2008/0166614 | A1 | 7/2008 | Brinner et al. | |
| 2009/0042086 | A1* | 2/2009 | Ishikawa | H01M 8/0254 429/434 |
| 2010/0285383 | A1 | 11/2010 | Reinert | |
| 2011/0229799 | A1 | 9/2011 | Bogumil et al. | |
| 2012/0070761 | A1 | 3/2012 | Goebel | |
| 2012/0231370 | A1* | 9/2012 | Rock | H01M 8/0276 429/508 |

FOREIGN PATENT DOCUMENTS

| | | |
|---|---|---|
| JP | 2006 128040 | 5/2006 |
| JP | 2006 302702 | 11/2006 |

OTHER PUBLICATIONS

JP 2006-128040 (May 2006) English machine translation (ESPACENET) Jul. 18, 2018 print date.*
Merriam-Webster (Merriam-Webster, resiliency entry, {https://www.merriam-webster.com/dictionary/resiliency}, definition 1 and example 1, printed Apr. 7, 2021).*
Wayback Machine evidence https://www.merriam-webster.com/dictionary/resiliency, online Apr. 21, 2009.*

* cited by examiner

ELECTROCHEMICAL DEVICE

RELATED APPLICATIONS

This application is a continuation application of PCT/EP2015/056062, filed on Mar. 23, 2015, which claims priority to German App. No. 10 2014 104 017.1, filed Mar. 24, 2014, the entire specifications of which are incorporated herein by reference.

FIELD OF DISCLOSURE

The present invention relates to an electrochemical device which comprises the following:

a stack consisting of a plurality of electrochemical units which succeed one another along a stack direction and which each comprise an electrochemically active membrane electrode arrangement, a bipolar plate and at least one sealing element, at least one medium channel which extends along the stack direction through a plurality of the electrochemical units, at least one flow field through which a medium can flow out of the medium channel transversely with respect to the stack direction from the medium channel to another medium channel, and at least one connection channel through which the flow field and the medium channel are in fluid connection with one another.

BACKGROUND

In the case of known electrochemical devices of this type, the area of the electrochemical device through which flows a medium such as a fuel gas, an oxidizing agent or a cooling agent for example is sealed with respect to areas which are filled with another fluid medium when the electrochemical device is operational, or, with respect to a space surrounding the electrochemical device by sealing elements which are of substantially unaltered cross section over their entire sealing length.

When using metallic bipolar plates, the sealing elements are usually mutually offset in a direction running perpendicularly to the stack direction in the region of the connection channels between the medium channels and the flow fields of the electrochemical device, i.e., the sealing elements do not coincide over the entire sealing length—as viewed in the stack direction. This staggered arrangement of the sealing elements makes it difficult to evenly distribute the loads effective on the seals. Furthermore, due to the staggering of the sealing elements in certain areas, it is necessary to provide an edging foil or reinforcement foil at the edge of the electrochemically active membrane electrode arrangement since the mutually offset sealing elements are not capable of defining an edge of the electrochemically active region. Such an edging or reinforcement foil has to be applied in an additional process step.

In another known embodiment, the sealing element is guided around the medium channel on that side of the bipolar plate on which a connection channel is located between the medium channel and a flow field, and a sealing element separating the medium channel from a flow field is only arranged on the other side of the bipolar plate. In this case however, a support or a reinforcement of the sealing element for which there is no counterpart on the other side of the bipolar plate is then required, thereby entailing more complex constructional solutions. Furthermore, in this known embodiment too, the sealing lines of the sealing elements succeeding one another in the stack direction no longer overlap each other completely.

SUMMARY OF THE INVENTION

The object of the present invention is to provide an electrochemical device of the type mentioned hereinabove which enables the sealing elements succeeding one another in the stack direction to overlap even in the region of a connection channel and does not require a complex constructional solution for the support or reinforcement of the sealing element.

In accordance with the invention, this object is achieved by an electrochemical device in accordance with claim 1 wherein the sealing arrangement comprises a connection channel region in which the sealing arrangement crosses the at least one connection channel, and at least one neighboring region which is located in front of or behind the connection channel region in the longitudinal direction of the sealing arrangement, wherein the sealing arrangement and in particular at least one sealing element of the sealing arrangement has a lower average height in the connection channel region than in the neighboring region.

Thus, the concept underlying the invention is to provide a height-adapted or height-profiled sealing arrangement and in particular at least one height-adapted or height-profiled sealing element in the region of the medium supply point and/or the medium removal point between a medium channel and a flow field associated with the medium channel.

In particular, the connection channel can be bounded by two parts or layers of a bipolar plate that touch in an edge region which surrounds the flow field and the medium channel. Hereby for example, the parts or layers of the bipolar plate can be welded or stuck together or joined to one another in sealed manner in some other way.

The two parts or layers of the bipolar plate are spaced from each other in the region of the connection channel in order to create a fluid connection between the medium channel and the associated flow field.

A region of a part or a layer of a bipolar plate which is offset away from the other part or the other layer of the bipolar plate along the stack direction for the purposes of forming the connection channel, is referred to hereinafter as a raised region.

The differences in height between the raised region and the adjoining regions of the part or the layer of the bipolar plate are so small in the region of the connection channel that, on the one hand, the sealing element is still compressed to the extent necessary to produce a reliable seal even when there is an offset as is to be expected during the process of assembling the electrochemical device, but on the other hand, it is not compressed so much as to damage the bipolar plate or the sealing element.

It is to be assumed that a sealing element having a desired sealing-gap-height in the region of some tenths of a millimeter up to approximately one millimeter will still function reliably even in the case of a maximum deviation of the gap dimension of approximately 0.05 mm to approximately 0.2 mm, wherein the exact value of the permitted deviation is dependent on the gap dimensions and the sealing materials.

If the gradients in the flanks of the raised regions amount to maximally 45°, the allowable deviation of the gap dimension is not exceeded in the case of an assembly precision of a few tenths of a millimeter for a stack of the components of the electrochemical device.

Preferably, the gradients in the flanks of the raised regions lie in the region of less than 30° and in particular in the region of less than 20°.

In the electrochemical device according to the invention, a closed sealing line which surrounds the flow field can be guided across the connection channel, and the sealing elements succeeding one another in the stack direction can be arranged to be substantially overlapping over their entire sealing length.

The raised region of the bipolar plate in the region of the connection channel can be stabilized by the structural design of the bipolar plate.

In particular in regard to the material being used and the design of the raised region, provision may be made for the bipolar plate to be formed in such a way that the bipolar plate has sufficient inherent stability in the region of the raised region for the connection channel to remain opened even when the electrochemical units succeeding one another in the stack direction are clamped against each other.

As an alternative or in addition thereto, provision may be made for the bipolar plate to comprise supporting regions and/or supporting elements in the region of the connection channel which mechanically stabilize the raised region.

As an alternative or in addition thereto, provision may be made for a stabilizing element to be arranged between the bipolar plates in the region of the connection channel in order to support the raised region of at least one bipolar plate.

Such a stabilizing element can be an element which is manufactured separately from the bipolar plates and is inserted between the bipolar plates.

As an alternative thereto, provision may also be made for the stabilizing element to be formed in one piece manner with one of the bipolar plates and to be introduced into the gap between the bipolar plates by a folding process.

The sealing surface upon which the sealing element abuts on a bipolar plate in the region of the connection channel can be substantially flat.

However, it is also possible for this sealing surface to comprise structures. For example, provision could be made for the sealing surface to be corrugated.

If the height h (i.e. the extent along the stack direction) of the sealing arrangement in the fully assembled state of the electrochemical device is of the same size throughout the connection channel region or the neighboring region, then the average height of the sealing arrangement in the region concerned corresponds to this constant height. If however, the height h of the sealing arrangement in the fully assembled state of the electrochemical device varies in the connection channel region and/or in the neighboring region then the average height of the sealing arrangement in the region concerned corresponds to an average value which is to be determined by a process of averaging over the length of the region concerned.

In one preferred embodiment of the invention, provision is made for a transition region to be arranged between the connection channel region and the neighboring region wherein the height of the sealing arrangement in the transition region decreases from the neighboring region to the connection channel region.

The fluid medium can, in particular, be an oxidizing agent, a fuel gas or a cooling agent of the electrochemical device.

Preferably, the medium can flow through the flow field substantially perpendicularly with respect to the stack direction of the electrochemical device from the medium channel to another medium channel.

Preferably, at least one sealing element of the sealing arrangement is in contact with the bipolar plate in the connection channel region and in the neighboring region, wherein the average spacing H of an outer surface of the bipolar plate facing this sealing element from a reference plane of the bipolar plate that is oriented perpendicularly with respect to a stack direction is larger in the connection channel region than in the neighboring region.

In particular hereby, the reference plane may be a central plane of a two-layered bipolar plate along which the two layers of the bipolar plate fit together in an edge region of the bipolar plate and/or in the neighboring region of the sealing arrangement.

The outer surface of the bipolar plate facing the sealing element is preferably inclined with respect to the reference plane of the bipolar plate in a transition region arranged between the connection channel region and the neighboring region.

The average angle of inclination of the outer surface of the bipolar plate facing the sealing element with respect to the reference plane amounts to at most approximately 45°, in particular to at most approximately 30° and particularly preferred to at most approximately 20° in the transition region.

Furthermore, provision is preferably made for the sum of the average height h of the sealing arrangement and the average spacings $H_1$, $H_2$ from the reference plane of the outer surfaces of the bipolar plate remote from the reference plane of the bipolar plate in the connection channel region $(h_v+H_{V1}+H_{V2})$ and in the neighboring region $(h_N+H_{N1}+H_{N2})$, and particularly preferred in the transition region $(h_U+H_{U1}+H_{U2})$ as well, to be of substantially the same size.

In a preferred embodiment of the invention, provision is made for at least one of the electrochemical units to comprise a sealing arrangement incorporating two sealing elements which together bridge a spacing between the bipolar plate of the electrochemical unit concerned and a bipolar plate of a neighboring electrochemical unit along the stack direction.

Hereby, provision may be made for the sealing elements to be formed and arranged in such a manner that they at least partly overlap each other—as viewed along the stack direction, preferably over the entire length of the sealing elements.

It is particularly expedient if the sealing elements are formed and arranged in such a manner that one of the sealing elements completely overlaps the other sealing element—as viewed along the stack direction, preferably over the entire length of the sealing elements.

In a preferred embodiment of the invention, the bipolar plate comprises two parts or layers which are spaced from each other, at least in sections, in the connection channel region.

Hereby, in the case of two parts or layers of the bipolar plate, provision may be made for the average spacing $H_1$, $H_2$ from the reference plane of the bipolar plate of the outer surface of the bipolar plate remote from of the reference plane of the bipolar plate to be larger in the connection channel region than in the neighboring region.

In this case, both parts or layers of the bipolar plate are provided with a respective raised region in the region of the connection channel. Hereby, these raised regions may be of the same height or of mutually differing heights along the stack direction.

Furthermore, provision may be made for the average spacing $H_1$, $H_2$ from the reference plane of the bipolar plate of the outer surface of the bipolar plate remote from the reference plane of the bipolar plate in the case of one of the parts or layers of the bipolar plate to be of substantially the same size in the connection channel region and in the neighboring region.

In this case, only one of the parts or only one of the layers of the bipolar plate is provided with a raised region in the region of the connection channel.

In order to ensure that the connection channel remains open even after the electrochemical units of the electrochemical device have been clamped together, provision may be made for at least one the parts or layers of the bipolar plate to be provided with one or more supporting regions with which this part or this layer of the bipolar plate is supported on the respective other part or on the respective other layer in the connection channel region.

The supporting region can be in the form of a round or elongate dish or a web member for example.

The supporting region is preferably covered substantially entirely by the sealing element.

The supporting region is preferably formed in one piece manner with a respective one of the parts or layers that is to be supported.

In order to ensure that the connection channel remains open even after the electrochemical units of the electrochemical device have been clamped together, provision may be made, as an alternative or in addition to such supporting regions, for at least one stabilizing element to be arranged in the gap between the two parts or layers of the bipolar plate.

Such a stabilizing element can be manufactured separately from the parts or layers of the bipolar plate and be inserted into the gap between the two parts or layers of the bipolar plate.

As an alternative thereto, provision may also be made for the stabilizing element to be formed in one piece manner with one of the parts of the bipolar plate.

In this case, when assembling the bipolar plate, the stabilizing element can be introduced into the gap between the two parts or layers of the bipolar plate, in particular, by means of a shaping process such as a folding process for example.

In principle, the sealing element can be fixed to any other element of the electrochemical unit comprising the sealing element.

For example, provision may be made for the sealing element to be fixed to the bipolar plate.

In one preferred arrangement of the invention however, provision is made for the at least one sealing element of the sealing arrangement to be fixed to the membrane electrolyte arrangement of the respective electrochemical unit.

It is particularly expedient if at least one sealing element is fixed to a gas diffusion layer of the membrane electrolyte arrangement of the respective electrochemical unit.

In particular, the sealing element can be sprayed on or adhered to the membrane electrolyte arrangement and in particular to a gas diffusion layer of the membrane electrolyte arrangement.

Preferably, at least one sealing element comprises an elastomeric material. In particular, provision may be made for the sealing element to be formed substantially entirely of an elastomeric material.

The bipolar plate preferably comprises a metallic material and in particular can be formed substantially entirely of a metallic material.

The electrochemically active membrane electrode arrangement preferably comprises a polymer electrolyte membrane (PEM).

In particular, the electrochemical device can be in the form of a stack of fuel cells or an electrolyser.

In the case of the electrochemical device according to the invention, the height of the sealing element or the height of the sealing elements of the sealing arrangement in the region of the connection channel is matched to the contour of the sealing surface of the bipolar plate in such a way that a closed sealing line is obtained around the flow field and/or the medium channel.

Moreover, the flanks of a region of the bipolar plate that is raised in the region of the connection channel can also be sealed by means of such a height-variable sealing element or height-variable sealing elements.

Sealing elements on different sides of a bipolar plate can be implemented—as viewed in the stack direction—such as to be substantially overlapping and in particular substantially congruent.

Due to the adjustment in height of the sealing element or the sealing elements of the sealing arrangement, it is no longer necessary to offset the sealing elements perpendicularly to the stack direction.

The sealing element of the sealing arrangement can surround the electrochemically active membrane electrode arrangement directly; in particular, it is no longer necessary to provide the membrane electrode arrangement with an additional reinforcement edge.

It is preferred that at least one sealing element be molded on to a gas diffusion layer of the membrane electrode arrangement. It follows that the height of the sealing profile is thereby adapted to the shape of the raised region of a part or a layer of the bipolar plate in the region of the connection channel.

However, as an alternative or in addition thereto, flat seals of variable height can also be employed as sealing elements on one or on both sides of a bipolar plate, these seals preferably cooperating with a sealing projection which is provided on the bipolar plate and is in the form of a knife-edge or a compression edge for example in order to seal the sealing gap.

The sealing arrangement is preferably implemented in two-parts, in particular, with an anode-side gas diffusion layer serving as a carrier for a first sealing element and a cathode-side gas diffusion layer serving as a carrier for a second sealing element.

In a preferred embodiment, a base part comprises the medium channels on the periphery of which sealing sections are formed on both sides and the active surface in which the flow fields are arranged, and a part of a sealing profile is arranged on the periphery thereof on only one side.

In this case, a cover part comprises the second part of the sealing profile which surrounds a flow field of the bipolar plate and thus forms the second half of the sealing arrangement.

Further features and advantages of the invention form the subject matter of the following description and the graphical illustration of exemplary embodiments.

BRIEF DESCRIPTION OF THE DRAWINGS

Similar or functionally equivalent elements are designated by the same reference symbols in all of the Figures.

DETAILED DESCRIPTION OF THE INVENTION

An electrochemical device such as a stack of fuel cells or an electrolyser for example which is illustrated in FIGS. 1 to 4 and is designated as a whole by 100 comprises a stack which comprises a plurality of electrochemical units 106 such as fuel cell units or electrolysis units for example which succeed one another in a stack direction 104 and a (not illustrated) clamping device for subjecting the electrochemical units to a clamping force directed along the stack direction 104.

Figure 2:
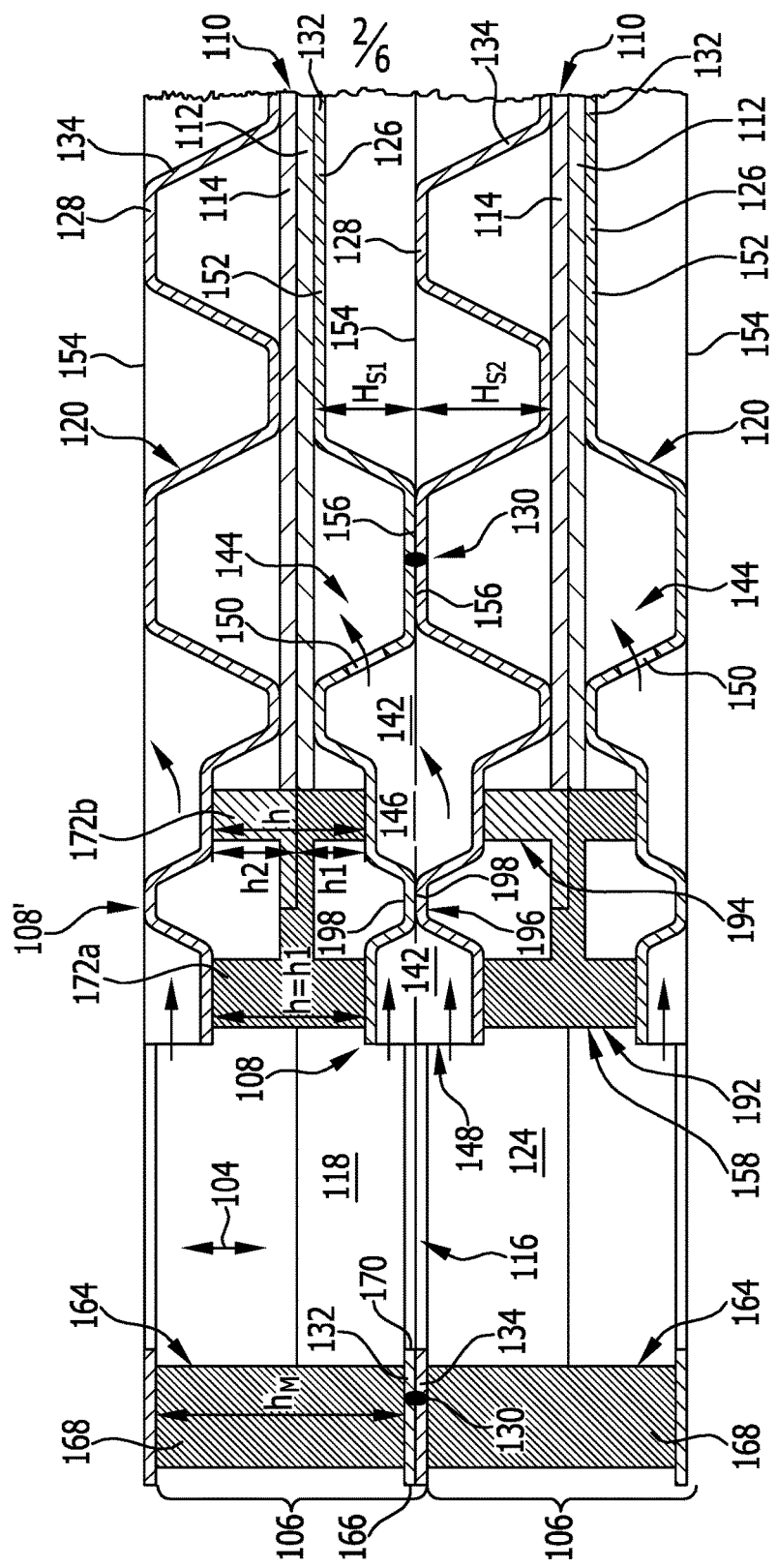
FIG. 2 a schematic section through the fuel gas supply of the electrochemical unit depicted in FIG. 1, along the line 2-2 in FIG. 1.
Figure 3:
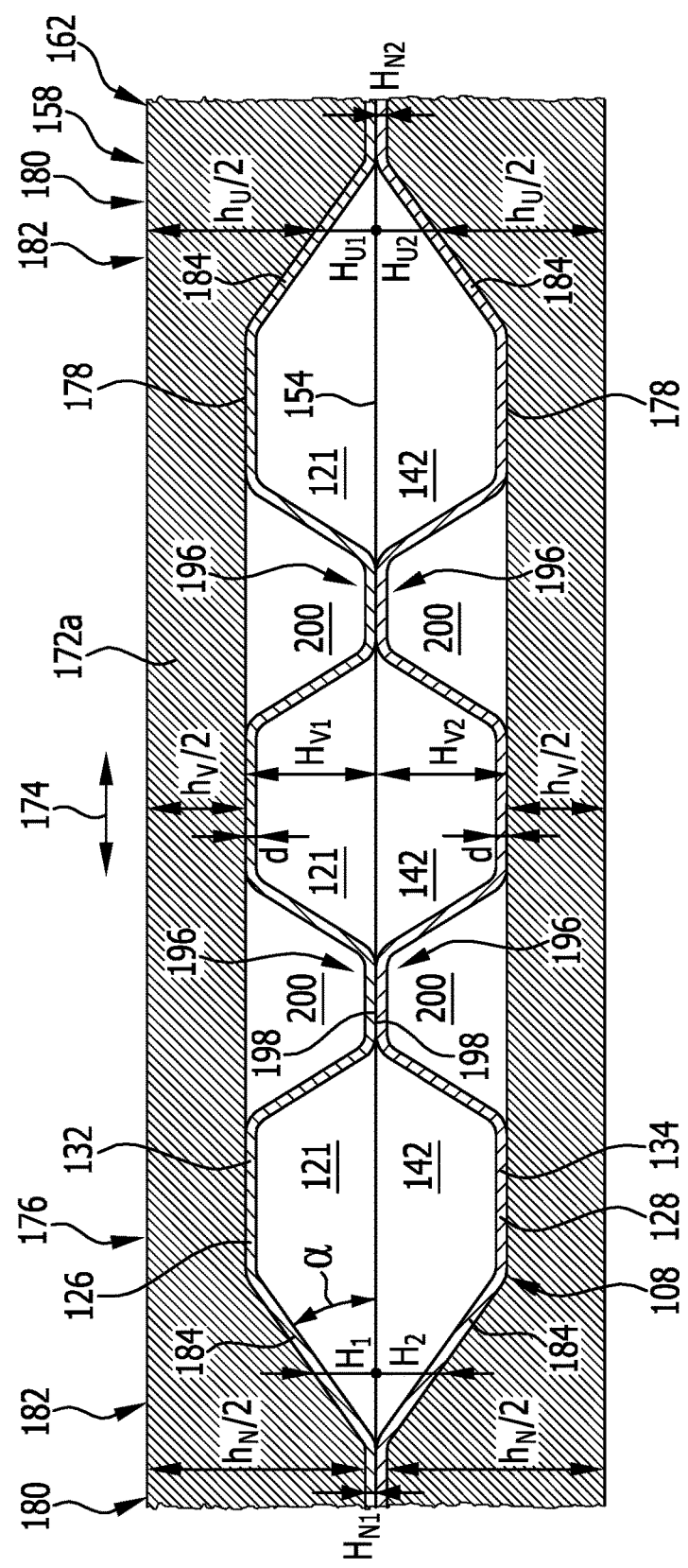
FIG. 3 a schematic longitudinal section through a sealing arrangement of the electrochemical unit depicted in FIG. 1, along the line 3-3 in FIG. 1.

As can best be seen from FIGS. 2 and 3, each electrochemical unit 106 of the electrochemical device 100 comprises a bipolar plate 108 and a membrane electrode arrangement (MEA) 110.

The membrane electrode arrangement 110 comprises a catalyst-coated membrane (CCM) for example and two gas diffusion layers 112 and 114, wherein a first gas diffusion layer 112 is arranged on the anode-side and a second gas diffusion layer 114 is arranged on the cathode-side. The bipolar plate 108 is formed of a metallic material for example.

The bipolar plate 108 comprises a plurality of medium passage openings 116 through each of which a fluid medium (in the case of a stack of fuel cells for example, a fuel gas, an oxidizing agent or a cooling agent) that is to be supplied to the electrochemical device 100 can pass through the bipolar plate 108.

The medium passage openings 116 of the bipolar plates 108 succeeding one another in the stack and the gaps located between the medium passage openings 116 in the stack direction 104 together form a respective medium channel 118.

Each medium channel 118 through which a fluid medium is conveyable to the electrochemical device 100 is associated with at least one other medium channel through which the corresponding fluid medium is removable from the electrochemical device 100.

The medium can flow out of the first medium channel 118 transversely, preferably substantially perpendicularly to the stack direction 104 to the second medium channel through an intermediate flow field 120 which is preferably formed on a surface of a neighboring bipolar plate 108 or (in the case of a cooling agent flow field for example) in the gap between the layers of a multi-layer bipolar plate 108.

Figure 1:
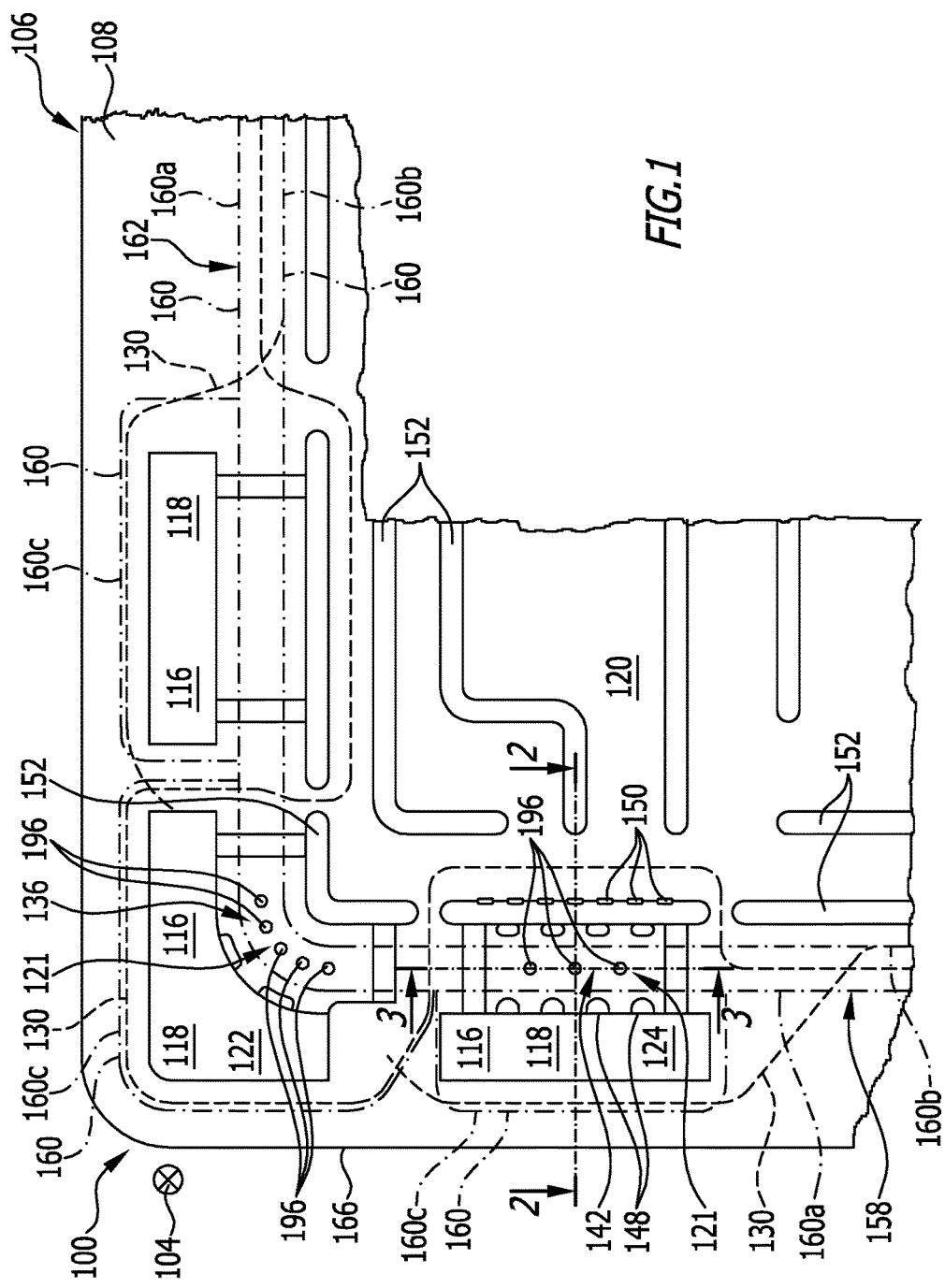
FIG. 1 shows a sectional schematic plan view of an electrochemical unit of an electrochemical device comprising a plurality of electrochemical units which succeed one another along a stack direction in the region of a fuel gas supply and a cooling agent supply.

A medium channel 122 for a cooling agent of the electrochemical device 100 and a medium channel 124 for a fuel gas of the electrochemical device 100 is illustrated in FIG. 1 for example.

Each medium channel 118 is in fluid connection with the respectively associated flow field 120 via a respective connection channel 121.

In the embodiment illustrated in the drawings, each bipolar plate 108 comprises a first part 126 and a second part 128 which are fixed together along connecting lines 130 that are illustrated by broken lines in FIG. 1 preferably in substance-to-substance manner and in particular by welding such as by laser welding for example.

In particular, the two parts 126 and 128 of the bipolar plate 108 can be in the form of a first layer 132 and a second layer 134 of the bipolar plate 108.

As can be seen from FIG. 1, the medium channel 122 for cooling agents is in fluid connection via a connection channel 136 for cooling agents which is formed by a gap between the first part 126 and a second part 128 of the bipolar plate 108 with a flow field for the cooling agent which is formed in the gap between the first part 126 and the second part of the bipolar plate 128.

As can be seen from FIG. 2, the medium channel 124 for fuel gas is in fluid connection via a connection channel 142 for fuel gas with a flow field 144 for the fuel gas which is formed between the first part 126 of the bipolar plate 108 and the first gas diffusion layer 112.

The connection channel 142 comprises a connecting chamber 146 which is formed by a gap between the first part 126 and the second part 128 of the bipolar plate 108 and is in fluid connection with the medium channel 124 via inlet openings 148 facing the medium channel 124 for fuel gas, and it is in fluid connection with the flow field 144 via passage openings 150 facing the flow field 144 for the fuel gas.

In order to guide the flow of the media through the respectively associated flow fields, the first part 126 and the second part 128 of the bipolar plate 108 are provided in the region of the flow fields 120 with flow guidance elements 152 which can be in the form of raised beadings for example.

The heights of the parts 126 and 128 of the bipolar plate 108 in the region of the flow guidance elements 152 are respectively $H_{S1}$ and $H_{S2}$ as measured from a common reference plane 154 of the bipolar plate 108.

The reference plane 154 is oriented perpendicularly to the stack direction 104 and runs through the contact surfaces 156 at which the two parts 126 and 128 of the bipolar plate 108 meet.

The reference plane thus forms a central plane of the multipart bipolar plate 108.

Unwanted escape of the fluid media from the medium channels 118 and the flow fields 120 of the electrochemical device 100 is prevented by a sealing arrangement 158 of which the sealing lines 160 thereof are illustrated in the plan view of FIG. 1 by dash-dotted lines.

The sealing arrangement 158 comprises a flow field section 162 having the outer sealing line 160*a* and the inner sealing line 160*b* which run between the flow fields 120 on the one hand and the medium channels 118 on the other and which cross the connection channels 121 via which the flow fields 120 and the respectively associated medium channels 118 are in fluid connection with one another.

Furthermore, the sealing arrangement 158 comprises medium channel sections 164 having sealing lines 160*c* which each surround a respective one of the medium channels 118 at least in sections and which separate the medium channel concerned 118 from an outside edge 166 of the bipolar plate 108.

The medium channel sections 164 of the sealing arrangement 158 each comprise a sealing element 168 which is arranged between a first layer 132 of a bipolar plate 108 and a second layer 134 of a neighboring bipolar plate 108' in the stack direction 104 and extends substantially parallel to an edge 170 of a medium passage opening 116 of the medium channel 118 concerned. In the region of the medium channel section 164, the sealing elements 168 of the sealing arrangement 158 have a height $h_M$ that is substantially constant in the longitudinal direction thereof.

The flow field section 162 of the sealing arrangement 158 preferably comprises two sealing elements 172*a* and 172*b* which are likewise arranged between the first layer 132 of the bipolar plate 108 and the second layer 134 of the neighboring bipolar plate 108'.

Hereby, the first sealing element 172*a* is preferably fixed to the first gas diffusion layer 114 (to the anode side for example) and the second sealing element 172*b* is preferably fixed to the second gas diffusion layer 112 of the membrane electrode arrangement 110 (to the cathode side for example).

For example, provision may be made for the sealing elements 172*a* and 172*b* to be molded or cast on to the respectively associated gas diffusion layer 112 and 114.

Hereby, provision may be made for the first sealing element 172*a* to abut on both the first layer 132 of the bipolar plate 108 and on the second layer 134 of the neighboring bipolar plate 108' in the region of the outer sealing line 160*a* for example and to abut on the first layer 132 of the bipolar plate 108 and on the second sealing element 172*b* in the region of the inner sealing line 160*b*, whilst the second sealing element 172*b* abuts on the second layer of the bipolar plate 108' and on the first sealing element 172*a* in the region of the inner sealing line 160*b*.

The sealing elements 168 of the medium channel sections 164 of the sealing arrangement 158 can be formed in one piece manner with the first sealing element 172*a* of the flow field section 162 of the sealing arrangement 158.

The sealing arrangement 158 can thus be formed in two parts, wherein a first part 192 of the sealing arrangement 158 comprises the first sealing element 172*a* of the flow field section 162 and the sealing elements 168 of the medium channel sections 164 and is preferably carried by the first gas diffusion layer 112 and wherein a second part 194 of the sealing arrangement 158 comprises the second sealing element 172*b* of the flow field section 162 and is preferably carried by the second gas diffusion layer 114.

Since the first layer 132 and the second layer 134 of the bipolar plate 108 are spaced from each other in the region of a connection channel 121 (outside the supporting regions 196) (see in particular FIGS. 2 and 3), the sealing elements 172*a*, 172*b* in this region of the flow field section 162 of the sealing arrangement 158 have an overall height h which is smaller than the height $h_M$ of a sealing element 168 in the medium channel section 164 of the sealing arrangement 158.

The overall height h thereby corresponds to the sum of the individual heights $h_1$ and $h_2$ of the respective sealing elements 172*a* and 172*b*.

As can be seen in particular from the longitudinal section through the flow field section 162 of the sealing arrangement 158 in the region of the outer sealing line 160*a* in FIG. 3, the height $h_1$, $h_2$ of the sealing elements 172*a*, 172*b* in the fully assembled state of the electrochemical device 100 varies along the longitudinal direction 174 of the sealing arrangement 158 so as to thereby compensate for a variation of the spacing of the layers 132, 134 of the bipolar plate 108 from the reference plane 154.

Figure 4:
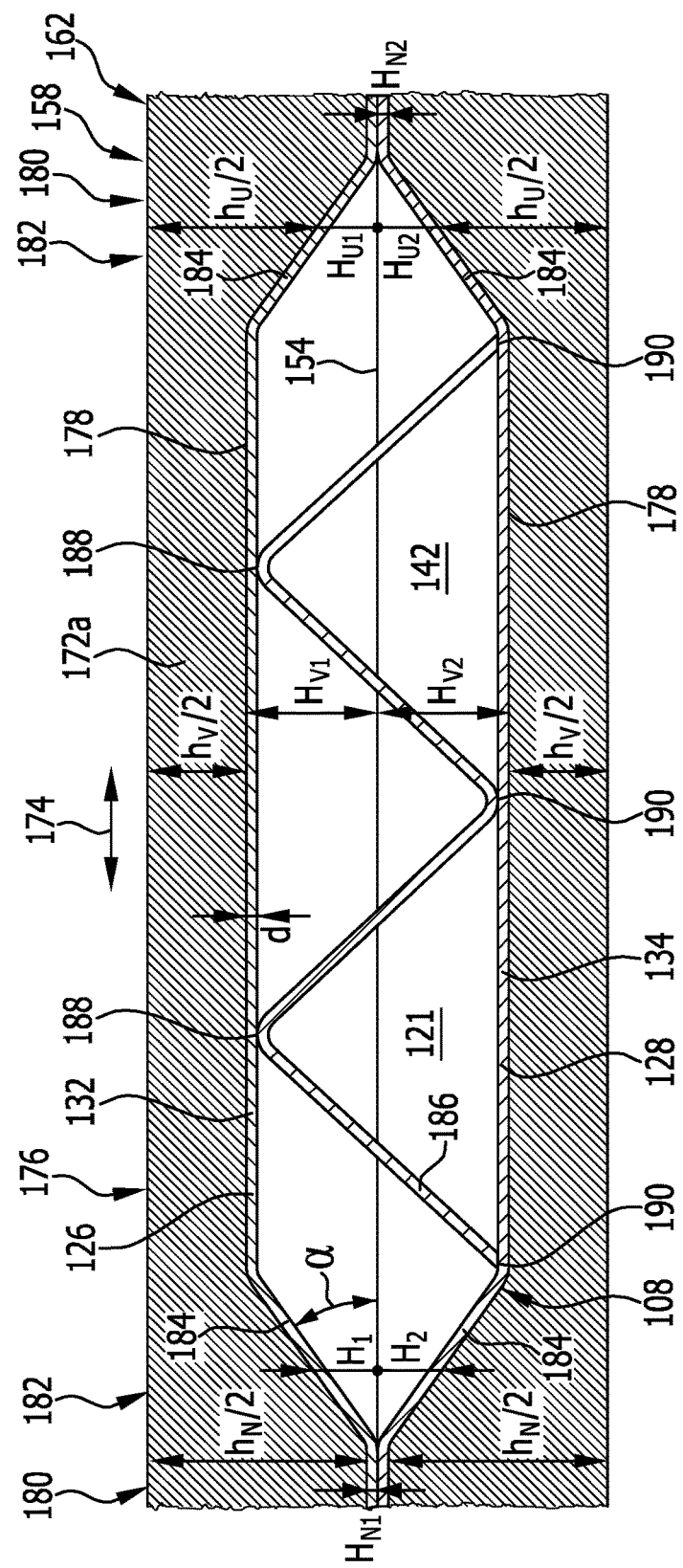
FIG. 4 a schematic longitudinal section corresponding to FIG. 3 through the sealing arrangement of the electrochemical unit in a second embodiment of the electrochemical unit, wherein the electrochemical unit comprises a two-piece bipolar plate and a stabilizing element is arranged in the gap between the two parts of the bipolar plate.

As can be seen from FIG. 4, the flow field section 162 of the sealing arrangement 158 comprises a connection channel region 176 in which the flow field section 162 crosses the connection channel 121 (the connection channel 142 for fuel gas for example).

The sealing elements 172*a* and 172*b* have an overall height $h_V$ in this connection channel region 176.

The mutually remote outer surfaces 178 of the first layer 132 and the second layer 134 of the bipolar plate 108 in the connection channel region 176 (outside the supporting regions 196) are spaced by a respective distance $H_{V1}$ and $H_{V2}$ from the reference plane 154 which is larger than the thickness d of the layer 132, 134 concerned.

Furthermore, the flow field section 162 of the sealing arrangement 158 comprises neighboring regions 180 of the sealing arrangement 158 which are respectively located in front of and behind the connection channel region 176 in the longitudinal direction 174, wherein in these regions, the sealing elements 172*a*, 172*b* have the overall height $h_N$ which is greater than the overall height $h_V$ of the sealing elements 172*a*, 172*b* in the connection channel region 176.

The respective spacings $H_{N1}$ and $H_{N2}$ of the outer surfaces 178 of the first layer 132 and the second layer 134 of the bipolar plate 108 from the reference plane 154 correspond to the respective material thicknesses d of the first layer 132 and the second layer 134 of the bipolar plate 108 in the neighboring regions 180. The spacings $H_{N1}$ and $H_{N2}$ in the neighboring regions 180 are thus lower than the respective spacings $H_{V1}$ and $H_{V2}$ in the connection channel region 176.

A respective transition region 182 of the sealing arrangement 158 is arranged between the connection channel region 176 and a respective neighboring region 180 in which the overall height $h_U$ of the sealing elements 172*a*, 172*b* increases, preferably continuously and in particular substantially linearly along the longitudinal direction 174 from the overall height $b_V$ at the edge of the connection channel region 176 up to the overall height $h_N$ at the edge of the adjoining neighboring region 180.

Commencing from the values $H_{V1}$ and $H_{V2}$ at the edge of the connection channel region 176, the respective spacings $H_{U1}$ and $H_{U2}$ of the outer surfaces 178 of the first layer 132 and the second layer 134 of the bipolar plate 108 from the reference plane 154 in the transition regions 182 decrease, preferably continuously and in particular substantially linearly along the longitudinal direction 174 up to the values $H_{N1}$ and $H_{N2}$ at the edge of the respective adjoining neighboring region 180.

In the transition regions 182, the layers 132 and 134 of the bipolar plate 108 thus form ramps 184 that are inclined with respect to the reference plane 154 and with respect to the stack direction 104, which said ramps support the sealing elements 172*a* and 172*b*.

The average angle of inclination a with respect to the reference plane 154 of the respective outer surface 178 of the first layer 132 and the second layer 134 of the bipolar plate 108 facing the respectively associated sealing element 172a, 172b preferably amounts to at most approximately 45° and in particular to at most 30° and particularly preferred to at most 20° in the region of the ramps 184.

The sum of the overall height h of the respective sealing elements 172a, 172b and the spacings $H_1$ and $H_2$ of the respective associated layer 132 and 134 of the bipolar plate 108 from the reference plane is substantially constant along the longitudinal direction 174 of the sealing arrangement 158 in the flow field section 162 ($h_N + H_{N1} + H_{N2} = h_U + H_{U1} + H_{U2} = h_V + H_{V1} + H_{V2}$).

Due to this design of the flow field section 162 of the sealing arrangement 158, the effect is achieved on the one hand that the layers 132 and 134 of the bipolar plate 108 are spaced sufficiently far away from each other in the connection channel region 176 as to ensure an adequate flow of fluid between the medium channel 118 and the flow field 120 through the connection channel 121.

On the other hand, the effect is achieved that the height of the sealing elements 172a, 172b is as great as possible outside the connection channel region 176 so as to enable these sealing elements 172a, 172b to exhibit as large a degree of resilient deformability there as possible and also enable large dynamic fluctuations in thickness to be compensated when the electrochemical device 100 is operational.

Furthermore, due to this design of the sealing arrangement 158, the effect is achieved that the sealing elements 172a, 172b of the electrochemical units 106 succeeding one another in the stack direction 104 can overlap one another at least partly and preferably completely in the flow field section 172 of the sealing arrangement 158—as viewed along the stack direction 104.

Preferably, the sealing elements 172a and 172b of electrochemical units 106 succeeding one another in the stack direction 104 are formed and arranged substantially congruently.

The overall height $h_N$ of the sealing elements 172a, 172b in the neighboring region 180 of the flow field section 162 of the sealing arrangement 158 can be substantially the same as the height $h_M$ of the sealing element 168 in the medium channel section 164 of the sealing arrangement 158.

In the first embodiment of an electrochemical device 100 that is illustrated in FIGS. 1 to 3, the spacing between the two layers 132 and 134 of the bipolar plate 108 which bound the connection channel 121 is also retained in the connection channel region 176 of the sealing arrangement 158 outside the supporting regions 196 even when the electrochemical units of the electrochemical device 100 are clamped together in the stack direction 104 because the layers 132 and 134 project towards one another in the supporting regions 196 and touch the supporting surfaces 198 of the supporting regions 196 and are supported on each other.

The supporting regions 196 can be in the form of dishes or web members for example. The supporting regions 196 are preferably formed in one piece manner with respective ones of the two layers 132 or 134 that are to be supported and are preferably formed on the respective layer 132 or 134 by a shaping process, in particular, a stamping or a deep-drawing process.

The medium flowing through the connection channel 121 preferably flows laterally past the supporting regions 196.

The interior spaces 200 of the supporting regions 196 are preferably located outside the connection channel 121.

A second embodiment of an electrochemical device 100 which is illustrated in FIG. 4 differs from the embodiment illustrated in FIGS. 1 to 3 in that the layers 132 and 134 of the bipolar plate 108 do not have supporting regions 196 in the region of the connection channel 121 and in that at least one stabilizing element 186 is arranged in the gap between the two layers 132 and 134 of the bipolar plate 108.

The stabilizing element 186 is supported at one or more support points 188 on the first layer 132 of the bipolar plate 108 and at one or more support points 190 on the second layer 134 of the bipolar plate 108.

The stabilizing element 186 may have a wave-like cross section.

The stabilizing element 186 can be in the form of a part that is manufactured separately from the layers 132 and 134 of the bipolar plate 108 and can be inserted into the gap between the two layers 132 and 134 of the bipolar plate 108 during the process of producing the bipolar plate 108.

As an alternative thereto, provision could also be made for the stabilizing element 186 to be formed in one piece with one of the two layers 132, 134 of the bipolar plate 108 and to be introduced into the gap between the two layers 132 and 134 of the bipolar plate 108 by a shaping process such as a folding process for example during the process of producing the bipolar plate 108.

The stabilizing element 186 then maintains the spacing between the first layer 132 and the second layer 134 of the bipolar plate 108 in the connection channel region 176 even when the layers 132, 134 of the bipolar plate 108 are subjected to a restraining force which exceeds their inherent stability.

In all other respects, the second embodiment of an electrochemical device that is illustrated in FIG. 4 corresponds in regard to the construction, functioning and mode of production with the first embodiment described in FIGS. 1 to 3, and so to that extent reference is made to the preceding description thereof.

Figure 5:
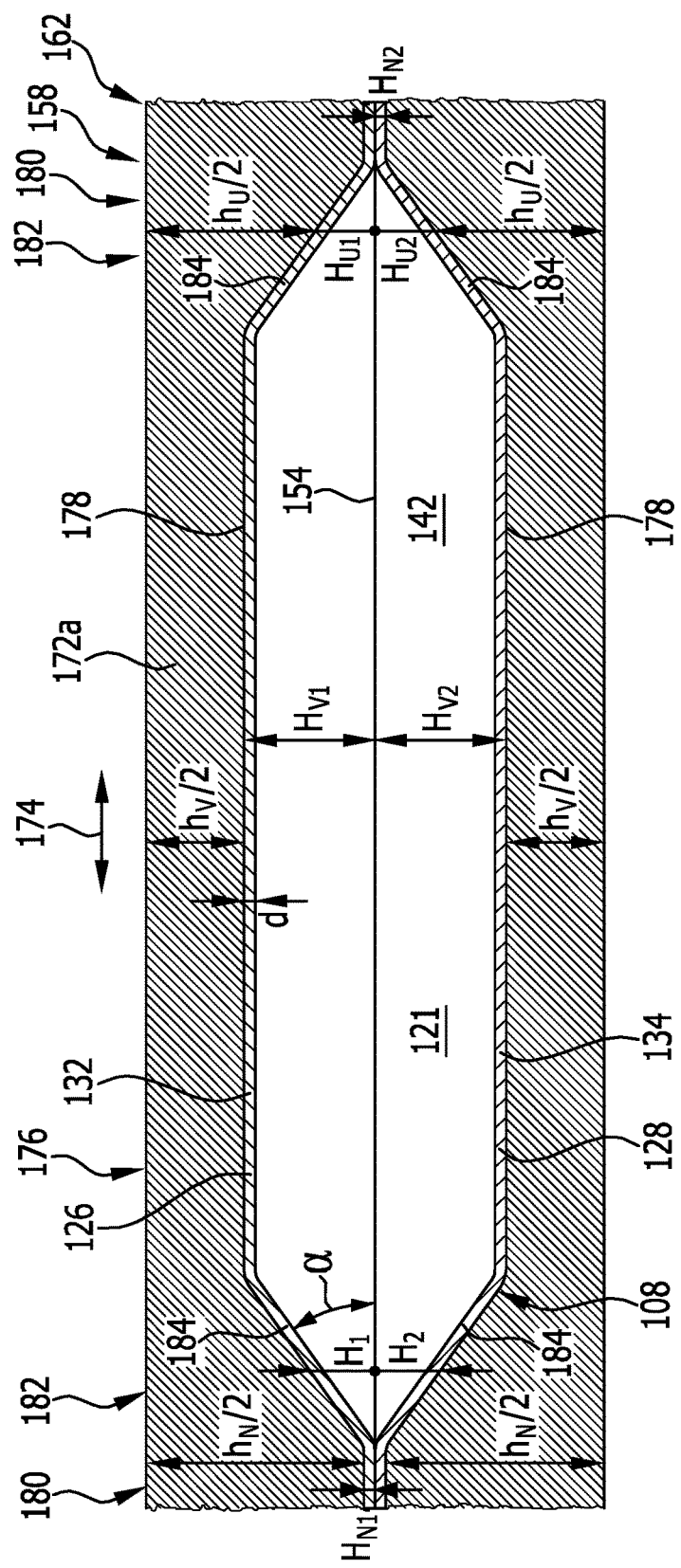
FIG. 5 a schematic longitudinal section corresponding to FIG. 3 through the sealing arrangement of the electrochemical unit in a third embodiment of the electrochemical unit, wherein the two-piece bipolar plate is of sufficient rigidity in a connection channel region of a flow field section of the sealing arrangement as to allow one to dispense with a support provided by supporting regions or a stabilizing element.

In a third embodiment of an electrochemical device 100 which is illustrated in FIG. 5, the spacing between the two layers 132 and 134 of the bipolar plate 108 which bound the connection channel 121 is retained in the connection channel region 176 of the sealing arrangement 158 simply due to the inherent stability of these layers 132, 134 even when the electrochemical units 106 of the electrochemical device 100 are clamped together in the stack direction 104 so that one can dispense with a stabilizing element 186 and with supporting regions 196 that are integrated into the bipolar plate 108 in this embodiment.

Figure 6:
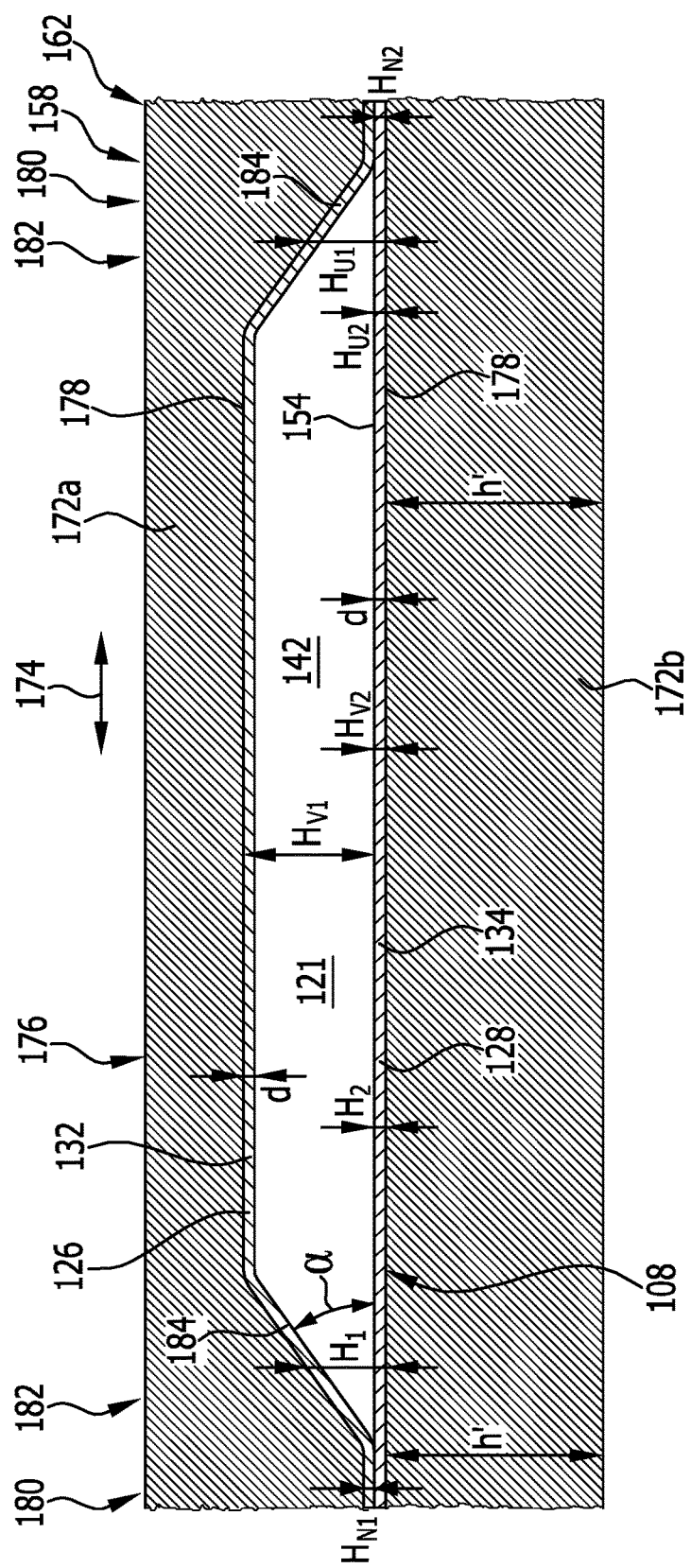
FIG. 6 a schematic longitudinal section corresponding to FIG. 3 through the sealing arrangement of the electrochemical unit, wherein the electrochemical unit comprises a two-piece bipolar plate and only one of the parts of the bipolar plate is of greater height in a connection channel region of a flow field section of the sealing arrangement than in a neighboring region which is located in front of or behind the connection channel region in the longitudinal direction of the flow field section of the sealing arrangement.

A fourth embodiment of an electrochemical device 100 which is illustrated in FIG. 6 differs from the third embodiment illustrated in FIG. 5 in that only the spacing $H_1$ or $H_2$ of one of the layers 132, 134 of the bipolar plate 108 from the reference plane 154 such as the spacing $H_1$ of the first layer 132 for example varies in the longitudinal direction 174 of the sealing arrangement 158 in the flow field section 162 of the sealing arrangement 158, as was previously described in connection with the first embodiment.

In this embodiment however, the respective other layer 132, 134 of the bipolar plate 108 i.e. the second layer 134 for example is formed substantially flat in the flow field section 162 so that the spacing $H_2$ of the outer surface 178 of the second layer 134 of the bipolar plate 108 from the reference plane 154 is substantially the same as the material thickness d of the second layer 134 throughout the flow field section 162.

For the purposes of adapting to this shape of the second layer 134 of the bipolar plate 108, the second sealing element 172b associated therewith is also of substantially the same height h' throughout the flow field section 162 and it can, in particular, correspond to the height $h_N$ of the second sealing element 172*b* in the neighboring regions 180 in the case of the first embodiment (see FIG. 3).

In all other respects, the fourth embodiment of an electrochemical device 100 that is illustrated in FIG. 6 corresponds in regard to the construction, functioning and mode of production with the first embodiment described in FIGS. 1 to 3, and so to that extent reference is made to the preceding description thereof.

In variants of the previously described embodiments, provision may be made for the overall height h of the sealing elements 172*a*, 172*b* to vary in the various ranges of the flow field section 162 of the sealing arrangement 158 and in particular in the connection channel region 176 and in the neighboring regions 180 because, in particular, the sealing surface is not completely flat and may be e.g. corrugated in the region of the connection channel region 176.

In this case, averaged values obtained over the respective region and thus in particular over the connection channel region 176 or one of the neighboring regions 180 are to be employed for $b_V$ and $h_N$. The same applies for the respective spacings $H_1$ and $H_2$ of the outer surfaces 178 of the layers 132, 134 of the bipolar plate 108 from the reference plane 154.

The invention claimed is:

1. An electrochemical device, comprising
   a stack consisting of a plurality of electrochemical units which succeed one another along a stack direction and which each comprise an electrochemically active membrane electrode arrangement, a bipolar plate and a sealing assembly comprising at least one sealing element, each of the at least one sealing element in each case being formed of an elastomeric material,
   at least one medium channel which extends along the stack direction through a plurality of the electrochemical units,
   at least one flow field through which a medium can flow out of the medium channel transversely with respect to the stack direction from the medium channel to another medium channel, and
   at least one connection channel through which the flow field and the medium channel are in fluid connection with one another,
   wherein the at least one connection channel comprises a connecting chamber,
   wherein the sealing assembly extends along a longitudinal direction of the sealing assembly which is substantially parallel to an edge of the medium channel and perpendicular to the stack direction and which is a circumferential direction along which the at least one sealing element of the sealing assembly surrounds the electrochemically active membrane electrode arrangement,
   wherein the sealing assembly comprises a flow field section having at least one sealing line which surrounds the flow field and runs parallel to the longitudinal direction of the sealing assembly between the flow field, the flow field being arranged inside of the at least one sealing line and the medium channel being arranged outside of the at least one sealing line,
   wherein the flow field section of the sealing assembly comprises a connection channel region in which the sealing assembly crosses the at least one connection channel, a first neighboring region which is located at a first side of the connection channel region, as seen in the longitudinal direction of the sealing assembly, and a second neighboring region which is located at a second side of the connection channel region, as seen in the longitudinal direction of the sealing assembly,
   wherein each of the at least one sealing element extends in one piece from the first neighboring region through the connection channel region into the second neighboring region,
   wherein the sealing assembly has a height corresponding to the sum of the extent(s) of the at least one sealing element of the sealing assembly along the stack direction,
   wherein an average height of the sealing assembly in the connection channel region is lower than an average height of the sealing assembly in the first neighboring region and lower than an average height of the sealing assembly in the second neighboring region,
   wherein the at least one sealing element of the sealing assembly is in contact with the bipolar plate in the connection channel region, in the first neighboring region and in the second neighboring region,
   wherein the bipolar plate is formed of a metallic material and comprises a first part and a second part which are fixed together along connecting lines by welding and are spaced from each other, at least in sections, in the connection channel region so that the connecting chamber of the at least one connection channel is formed by a gap between the first part and the second part of the bipolar plate,
   wherein the first part and the second part of the bipolar plate meet at contact surfaces,
   wherein a reference plane of the bipolar plate is oriented perpendicularly to the stack direction and runs through the contact surfaces, and
   wherein an average spacing of an outer surface of the first part of the bipolar plate from the reference plane of the bipolar plate in the connection channel region is larger than an average spacing of an outer surface of the first part of the bipolar plate from the reference plane of the bipolar plate in the first neighboring region and in the second neighboring region.

2. The electrochemical device in accordance with claim 1, wherein there is arranged, between the connection channel region and the first neighboring region or the second neighboring region, a transition region, in which the height of the sealing arrangement decreases commencing from the respective first or second neighboring region to the connection channel region.

3. The electrochemical device in accordance with claim 1, wherein the outer surface of the bipolar plate facing the sealing element is inclined with respect to the reference plane of the bipolar plate in a transition region that is arranged between the connection channel region and the first neighboring region or the second neighboring region.

4. The electrochemical device in accordance with claim 3, wherein the average angle of inclination of the outer surface of the bipolar plate facing the sealing element with respect to the reference plane amounts to at most approximately 45° in the transition region.

5. The electrochemical device in accordance with claim 1, wherein the sum of the average height of the sealing assembly, the average spacing of the outer surface of the first part of the bipolar plate from the reference plane of the bipolar plate and an average spacing of an outer surface of the second part of the bipolar plate from the reference plane of the bipolar plate is of substantially the same size in the connection channel region and in the first neighboring region and in the second neighboring region.

6. The electrochemical device in accordance with claim 1, wherein at least one of the electrochemical units comprises a sealing assembly having two sealing elements which together bridge a spacing between the bipolar plate of the electrochemical unit and a bipolar plate of a neighboring electrochemical unit along the stack direction.

7. The electrochemical device in accordance with claim 6, wherein the sealing elements are formed and arranged in such a manner that they at least partly overlap one another—as viewed along the stack direction.

8. The electrochemical device in accordance with claim 1, wherein the average spacing from the reference plane of the bipolar plate of the outer surface of the bipolar plate facing away from the reference plane of the bipolar plate is larger in the connection channel region than in the first neighboring region and in the second neighboring region in the case of both parts of the bipolar plate.

9. The electrochemical device in accordance with claim 1, wherein the average spacing from the reference plane of the bipolar plate of the outer surface of the bipolar plate remote from of the reference plane of the bipolar plate is of substantially the same size in the connection channel region as in the first neighboring region and in the second neighboring region in the case of one of the parts of the bipolar plate.

10. The electrochemical device in accordance with claim 1, wherein at least one of the parts of the bipolar plate is provided with one or more supporting regions with which this part of the bipolar plate is supported on the respective other part in the connection channel region.

11. The electrochemical device in accordance with claim 1, wherein at least one stabilizing element is arranged in the gap between the two parts of the bipolar plate.

12. The electrochemical device in accordance with claim 11, wherein the stabilizing element is formed in one piece with one of the parts of the bipolar plate.

13. The electrochemical device in accordance with claim 1, wherein at least one sealing element of the sealing assembly is fixed to the membrane electrolyte arrangement of the respective electrochemical unit.

* * * * *